US007225426B2

(12) United States Patent
Frank et al.

(10) Patent No.: US 7,225,426 B2
(45) Date of Patent: May 29, 2007

(54) DYNAMIC OBJECTS WITH PROPERTY SLOT DEFINITION AND RUNTIME MECHANISMS

(75) Inventors: Brian Spencer Frank, Richmond, VA (US); John W. Sublett, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 809 days.

(21) Appl. No.: 10/368,084

(22) Filed: Feb. 18, 2003

(65) Prior Publication Data

US 2003/0159129 A1    Aug. 21, 2003

Related U.S. Application Data

(60) Provisional application No. 60/357,329, filed on Feb. 15, 2002.

(51) Int. Cl.
*G06F 9/44*    (2006.01)
(52) U.S. Cl. ........................ 717/108; 717/121
(58) Field of Classification Search ................ 717/108, 717/121
See application file for complete search history.

(56) References Cited

U.S. PATENT DOCUMENTS

| 4,435,764 | A | 3/1984 | El-Gohary |
| 4,635,195 | A | 1/1987 | Jeppesen, III et al. |
| 4,677,566 | A | 6/1987 | Whittaker et al. |
| 4,747,041 | A | 5/1988 | Engel et al. |
| 4,935,863 | A | 6/1990 | Calvas et al. |
| 4,941,084 | A | 7/1990 | Terada et al. |
| 5,175,852 | A | 12/1992 | Johnson et al. |
| 5,511,188 | A | 4/1996 | Pascucci et al. |
| 5,522,044 | A | 5/1996 | Pascucci et al. |
| 5,550,980 | A | 8/1996 | Pascucci et al. |
| 5,598,566 | A | 1/1997 | Pascucci et al. |
| 5,786,993 | A | 7/1998 | Frutiger et al. |
| 5,862,052 | A | 1/1999 | Nixon et al. |
| 5,916,306 | A | 6/1999 | Ruiz |
| 5,918,233 | A | 6/1999 | La Chance et al. |
| 5,982,362 | A | 11/1999 | Crater et al. |
| 6,028,998 | A | 2/2000 | Gloudeman et al. |
| 6,047,222 | A | 4/2000 | Burns et al. |
| 6,055,562 | A * | 4/2000 | Devarakonda et al. ...... 709/202 |

(Continued)

OTHER PUBLICATIONS

The Design and Evolution of C++, Bjarne Stroustrup, pp. 72-78, Mar. 9, 1994.*

(Continued)

*Primary Examiner*—Todd Ingberg

(57) ABSTRACT

A component based software program, where each component is based on a component-type. Component-types are created from base classes comprising slot definitions. The slot definitions are identified and stored in a component-type object. One or more components of the component-type are created, each comprising a reference, to a component-type object and a slotmap having storage locations for values associated with property slots definitions, in the component-type object. Values for property slots are entered into components by being placed in the storage locations. Also disclosed is a method for automatically designating unique names to components. One root component is created. Further non-root components are placed within the root component or within other components, so that all components form a tree structure. A component is assigned a unique identification string, comprising a sequential list of all of the component's ancestors and the component's name.

28 Claims, 8 Drawing Sheets

U.S. PATENT DOCUMENTS

| | | | |
|---|---|---|---|
| 6,067,477 | A | 5/2000 | Wewalaarachchi et al. |
| 6,119,125 | A | 9/2000 | Gloudeman et al. |
| 6,157,943 | A | 12/2000 | Meyer |
| 6,185,566 | B1 | 2/2001 | Adams et al. |
| 6,189,109 | B1 | 2/2001 | Sheikh et al. |
| 6,353,853 | B1 | 3/2002 | Gravlin |
| 6,356,920 | B1 | 3/2002 | Vandersluis |
| 6,370,448 | B1 | 4/2002 | Eryurek |
| 6,681,243 | B1 * | 1/2004 | Putzolu et al. ............. 709/202 |
| 6,754,691 | B1 * | 6/2004 | Gomi et al. ................ 709/202 |
| 6,842,906 | B1 * | 1/2005 | Bowman-Amuah ......... 719/330 |
| 6,868,441 | B2 * | 3/2005 | Greene et al. ............. 709/220 |
| 6,886,158 | B2 * | 4/2005 | Kitayama .................. 717/162 |
| 7,080,159 | B2 * | 7/2006 | Chu et al. .................. 709/246 |
| 2002/0059583 | A1 | 5/2002 | Kim |
| 2002/0080945 | A1 | 6/2002 | Rojas |
| 2002/0114276 | A1 | 8/2002 | Basturk |
| 2003/0221162 | A1 | 11/2003 | Sridhar |

OTHER PUBLICATIONS

Interant Agents for Mobile Computing, D. Chess et al, IBM Oct. 1995, pp. 34-49.*

JAVA Aglet Application Programming Interface (J-AAPI) White Paper—Draft 2, IBM Tokyo, Feb. 19, 1997, 6 pages.*

Aglet Specification 1.1 Draft, Mitsuru Oshima et al, Sep. 8, 1998, 45 pages.*

Aglet Software Documentation Kit, IBM, printed Jan. 13, 2000, 2 pages.*

MAP: Design and Implementation of a Mobile Agent Platform, Antonio Puliafito et al, pp. 1-27, 2000.*

Aglet Specification 1.0, Mitsuru Oshima et al, May 20, 1997, 33 pages.*

Migrating to WML with GUI Extensions and XHTML Mobile Profile, Openwave, Nov. 2001, 11 pages.*

WML Language Reference, Openwave, 12 pages, printed Jan. 25, 2002.*

Openwave Developer Program, printed Jan. 25, 2002, 5 pages.*

WML Overview, Paul Adams, Webmonkey, 6 pages, printed Jan. 25, 2002.*

Intro to HDML, Paul Adams, Webmonkey, 6 pages, printed Jan. 25, 2002.*

"run-Time Programming Method for Reconfigurable Computer", Steve Casselman, Virtual Computer Corporation, 9 pages , Oct. 20, 1997.*

Linkers & Loaders, John R. Levine, Oct. 11, 1999, pp. 117-130.*

International Search Report.

"Proceedings of the 1996 Pacific Workshop on Distributed Multimedia Systems," Jun. 27-28, 1996, Department of Information and Systems Management, Hong Kong Kong University of Science and Technology, Clear Water Bay, Kowloon, Hong Kong.

Akio Orihara et al., "An Autonomous Decentralized System Platform Under Multi-vendor Environments in Building Automation," article, Apr. 1997, IEEE.

Schneider, Stanley A., et al. "ControlShell: Component-Based Real-Time Programming," article, May 1995, IEEE.

Section 7, "LonWorks Programming Model" of Motorola LonWorks Technology Device Data, Rev. 3.1 published in 1997 by Motorola Corporation of Illinois.

Section 8, "LonTalk Protocol" of Motorola LonWorks Technology Device Data, Rev. 3.1 published in 1997 by Motorola Corporation of Illinois. Appendix A "Neuron Chip Data Structures," Motorola LonWorks Technology Device Data, Rev. 3.1 published in 1997 by Motorola Corporation of Illinois.

Apprendix B "Network Management and Diagnostic Services" of Motorola LonWorks Technology Device Data, Rev. 3.1 published in 1997 by Motorola Corporation of Illinois.

White Paper "Baja: A Java(tm)—based Architecture Standard for the Building Automation Industry," by Tridium(tm) 2000 (9 pgs. plus cover).

Gaw, David: "Accessing LonWorks Networks from the World Wide Web," 1996, pp. 1-25.

Kendall, John: "Object Oreiented Techniques for Lifecycle Modeling of Complex Control Systems," Abstract, pp. 4/1/4/7, 1994, IEEE.

Ghosh, Kalyan K. et al.: "Object Oriented Modeling and Simulation of Process Plants with Discrete Logic Controls," Abstract, phs. 415-425, 1995, IEEE.

Heino, Perttu et al.: "An Expert System in Process Design—Analysis of Process Safety and Reliability," International Workshop on Artificial Intelligence for Industrial Application, 1988, pp. 225-231, IEEE.

Open Architecture Control Group, Working Specification "Open Architecture Control Initiative: JDC (Java For Distributed Control)," Jul. 1997, pp. 1-58.

Raji, Reza S.: "Control Networks and the Internet" Revision 2.0, @ECHELON, 1998 pp. 1-13.

Kojima, Fumio et al.: "Enhanced Network Computing (ENC) Part 3. ENC Implemenation," Toshiba Corporation 1998 (14 pages).

Gaw, David: "Hosted Node Programming Tutorial: Employing a Hosted Node Solution," Coactive Aesthetics, Inc., 18 pages.

Kojima, Fumio "Enhanced Network Computing (ENC) Part 1. Outline of ENC Architecture," pp. 1-6, Toshiba Corporation.

Raji, Reza et al.: "LonWorks and the Internet: Extending the Reach," LonUsers International Conference presentation, May 1998, 11 pages.

Gaw, David: "Connecting LonWorks and TCP/IP Enterprise Networks—Real Application Succeses," 1997, pp. 1-9, Coactive Aesthetics, Inc.

Yoshikazu Nakanishi, "Development of a Seamless Connection Technology Between Information Networks and Control Networks Using Java Language," Shikoku Research Institute Inc. (date of publication unknown).

Gaw, David et al.: "Requirements and System Architecture for Scalable, Integrated, Real-time Energy Management Systems," Coactive Networks, Inc., 1998, pp. 1-11.

Gaw, David: "LonWorks over the Internet: Technical Issues and Application," pp. 1-8, Coactive Aèsthetics, Inc.

Andersen, Torben: "Use of LonWorks Technology for a High Level Building Security System. Advantages and Limitations," LonUsers Fali Conference 1997, 6 pages.

Niagara Framework, "A fully internet-enabled distributed infrastructure for real-time access, automation and control of embedded devices," 2000.

Vykon By Tridium, "Unlocking the Power of the 'Net for Anytime, Anywhere Control," (10 pages).

Denning, Adam: "ActiveX Controls Inside Out," 1997 Microsoft Press, 2nd Edition, pp. xiii-xv, 3-5, 19-23, 67, 439-441 and 445-446.

Nilsson, Brent: "Object-Oriented Chemical Process Modelling in Omola," Proceedings of the 1992 IEEE Symposium on CACSD, Mar. 1992, pp. 165-172.

Robinson, J.T. et al.: "An Intelligent Dynamic Simulation Environment: An Object-Oriented Approach," Proceesings of the 1988 IEEE Symposium on Intelligent Control, Aug. 24, 1988, pp. 687-692.

Kramer J. et al., "CONIC: and Integrated Approach to Distributed Computer Control Systems," IEE PROC., vol. 130 Pt. E, No. 1, Jan. 1983.

Diaz-Gonzalez, Jose P.; Urban, Joseph E., "Language Aspects of Envisager: An Object Oriented Environment for the Specification of Real-time Systems," 1988, IEEE.

Eliassen, F. et al.: "A Multilayered Operating System for Microcomputers," Microprocessing and Microprogramming 14 (1984) Sep., No. 2, Amsterdam, Netherlands, pp. 45-54.

USENIX Association Summer Conference Proceedings, Atlanta 1986, Atlanta Georgia, 9th-13th Jun. 1986, pp. 172-181; J.M. Bloom, et al.: "Experiences Implementing BIND, a Distributed Name Server for the DARPA Internet."

Sheltzer, Alan B. et al.: "Name Service Locality and Cache Design in a Distributed Operating System," Proceedings of the 6th International Conference on Distributed Computing Systems, Cambridge, Massachusetts, May 19-23, 1986, pp. 515-522, IEEE, New York, U.S.

Ammar, Mostafa H. et al.: Using Hint Tables to Locate Resources in Distributed Systems,: Proceedings of the Seventh Annual Joint Conference of the IEEE Computer and Communication Societies, IEEE Infocom '88, New Orleans, Louisiana, Mar. 27-31, 1988, pp. 1050-1059. IEEE New York, U.S.

"Embedded Internet Technology—Allegro Software Company Overview," Allegro Software, http://www.allegrosoft.com/company.html, Printed Jan. 29, 2004.

International Preliminary Examination Report in connection with International Appl. No. PCT/US03/04803.

Thomas, Dave et al., Programming Ruby: The Pragmatic Programmer's Guide, Chapter 24, "Classes and Objects", pp. 379-392.

* cited by examiner

DYNAMIC OBJECTS WITH PROPERTY SLOT DEFINITION AND RUNTIME MECHANISMS

This patent application claims the benefit of priority under 35 U.S.C. 119(e) from U.S. Provisional Patent Application Ser. No. 60/357,329, filed Feb. 15, 2002, entitled "COMPONENT MODEL FOR REAL-TIME SYSTEM CONTROL", which is hereby incorporated by reference as if set forth in its entirety herein.

BACKGROUND OF THE INVENTION

Many different endeavors require custom software to solve their problems. Typically these problems are well understood by domain experts, such as, for example building automation experts, factory automation experts, and traffic control experts. However it is rare that domain experts have the required skills to use common programming techniques such as object oriented programming. Today domain experts must attempt to specify their requirements to programmers who then build the desired system. This process is error prone, time consuming and fraught with miscommunication. What is needed is the ability for domain experts who understand the problem space to be able to build the software system themselves. It is not feasible to expect that domain experts have the time or inclination to become professional programmers. Therefore it is necessary to provide tools which enable the creation of custom software by a lay person. Ideally these tools would allow a software system's configuration parameters, execution logic, and data to be visualized graphically. Graphical tools would allow the domain expert to create, monitor, and change the software system without having to understand cryptic programming language syntax.

Component oriented systems are part of a new concept that provides some of these features by encapsulating software functions into components that can be connected to build an application that addresses a real world need. However, known prior approaches still require knowledge of a programming language in order to implement a practical system. Software components, up to this point, still require programming skills to connect the components together to create a functional system. Furthermore, existing component technologies do not allow the domain expert to graphically visualize the entire system and make changes at runtime. For example a domain expert may wish to change execution flow or add a new behavior at runtime and immediately see what effect this has on the software system. This exploratory programming approach is at odds with current solutions which require the software to be stopped, recompiled, and then restarted. Furthermore additions, modifications or updates of the software may be needed in order to improve performance add features, etc. Current solutions once again require that the software be stopped, recompiled and restarted for any updates, additions or modifications. Stopping of the software may be especially difficult in some environments where critical processes are being controlled. Another specific challenge in providing such a solution is the need to allow the domain expert to enhance or extend software components to adapt them to the unique needs of a specific domain application. Historically these additions or extensions have required conventional programming skills and knowledge.

The present invention addresses these and other needs.

SUMMARY OF THE INVENTION

One aspect of the present invention is a software program whose code includes one or more components of the same component-type for execution on a machine. The components of that software program are generated by a specified method. In that method a base class is provided to a framework, the base class comprising one or more slot definitions at least one of which is a property slot definition. All the property slot definitions in the base class are identified. For each of these property slot definitions getter and setter methods are located. A component type object, which is configured to store slot definitions is generated. The identified property slot definitions are then stored in that component type object. One or more components are generated. Each of these components has a slotmap object, which is instantiated from the slot map class. Each slot map object also includes values for each property slot definition stored in the component-type object. Each value is associated with a single component thereby providing the ability to store data that is unique to each component.

In a further development of this aspect components are designed in such a way as to allow extension of their properties and data fields through dynamic slots.

In another aspect a method for automatically designating names to extensions of a component based software system is provided. In that method a root component is created. The root component has no parents. One or more non root components are placed within the root component and one or more other non root components are placed within non root components, so that all non-root components have a parent and the whole structure forms a tree. At that point a component is assigned a unique identification string comprising a sequential list of all the ancestors of the component and the component's name.

In a further development of this aspect the naming methodology extends to identify the individual slots of the component.

These and other aspects, features and advantages of the present invention can be further understood from the accompanying figures and description of preferred embodiments.

DETAILED DESCRIPTION OF THE PREFERRED EMBODIMENTS

Figure 1:
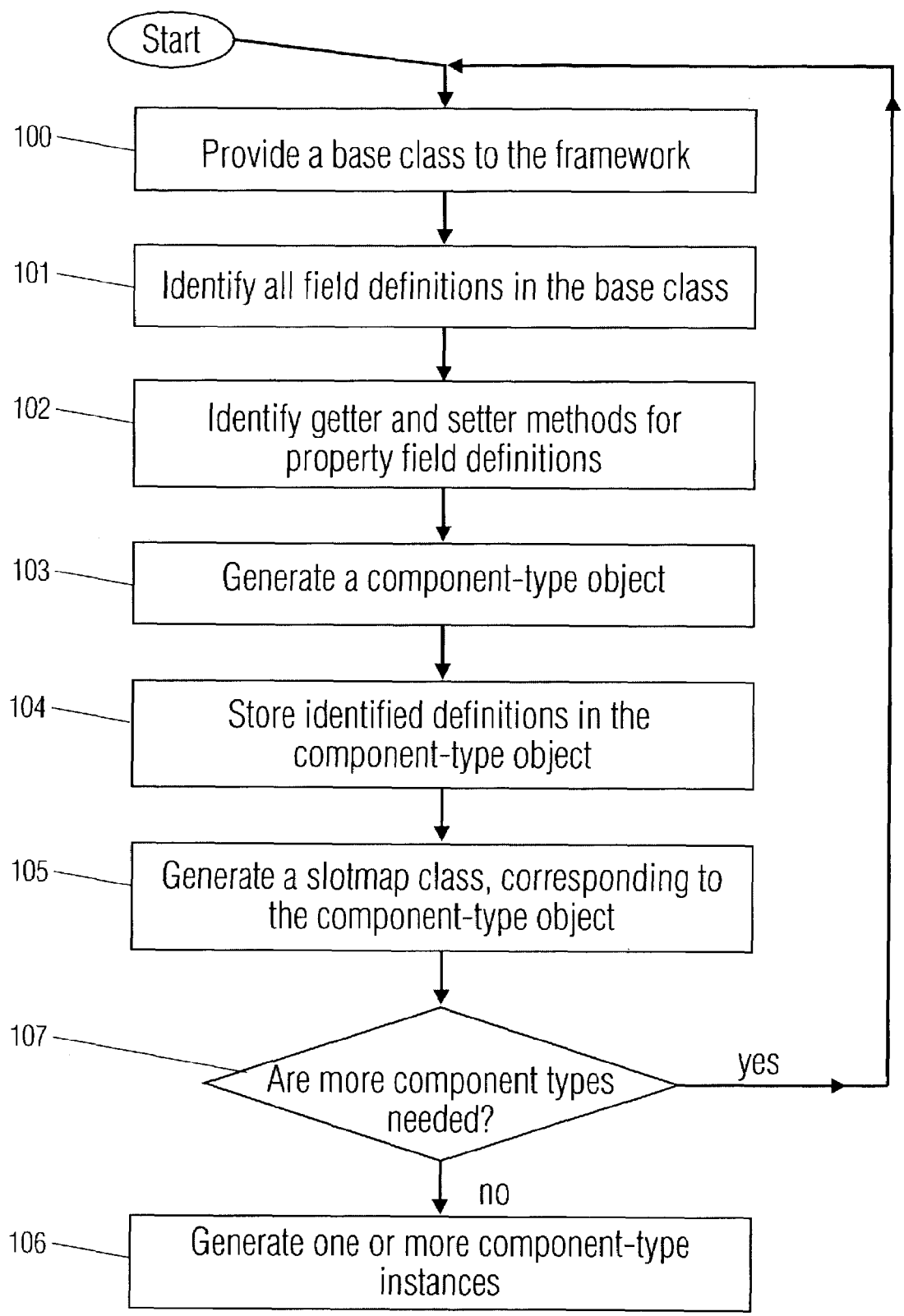
FIG. 1 is a flow chart showing the creation of a component-type and several component instances of that component-type.

The component model of the present invention provides a unique component design for software components that allows application developers to extend and modify software components in a graphical environment suitable for non-programmers. The component model design enables new slots, such as properties, actions or topics to be added to standard components without the software coding steps that would typically be required.

A component model approach to software development allows software components to be created that have a direct relation to the end use application, while still capitalizing on the benefits of object oriented software design. As such, components provide a higher level of abstraction than is present in a pure object-oriented approach. Where objects encapsulate behaviors that are applicable to software functions (such as handling a string, providing buffer management, etc), components may assemble objects to meet the needs of end application goals (such as providing a user interface presentation to change a schedule, to review alarms and convey acknowledgement commands back to the device issuing alarms, etc).

Two levels of abstraction are present—one is the object-oriented level, which deals with implementing the components, and the other is the component level which hides the object-oriented level and deals with creating applications pertinent to specific real world applications through the use of components. There are also at least two kinds of persons that may operate and modify the software of the present invention; the developer and the user. A developer implements the component model of this invention using object-oriented concepts. Optionally, the developer also creates functionality, which is defined on the component level. A user generally does not see the object-oriented implementation. Rather, a user deals almost exclusively with components and monitors, creates and modifies systems on the component level. Of course, the user and the developer could be the same person.

Components within a software program are created based on a component-type. The component-type is analogous to the concept of a class in object oriented programming, that is, it is an abstraction describing all the common features of the component instances that belong to that type. In a preferred embodiment, creation of component-types as well as most other component related functions is done by a framework, which we sometimes refer to as the Niagara™ Framework. The framework is a software module within a component based software that fulfills several utility functions related to the implementation of the component model, such as creating component-types and components, providing an interface between components and outside software modules, and providing the ability to extend components by adding slots to them, etc. The framework also provides for the execution flow of the software including during an initialization (bootstrap) phase and during component runtime execution.

Object oriented programs are composed of classes, which define a template used to allocate instances belonging to that class. Each class is composed of subparts called members. A member may be a field used to store data or may be a method used to store executable behavior.

This invention describes a component model built using object oriented primitives. The component model can then be used by non-programmers to build component oriented programs. The component model is composed of component-types, which define a template used to allocate instances belonging to that type (like object oriented classes). Each component-type is composed of subparts called slots (like object oriented members). The difference between slots and members is that slots exist at a much higher level of abstraction so that they may used directly by the non-programmer or end user of a component oriented program.

There are three types of slots in the component model. Properties are slots which store a data value. Properties may be used to store configuration data, provide real-time status information or store any other data. Actions are analogous to methods—they are slots which store execution behavior. For example, an action which an end user might invoke would be "Turn On Fan". Actions can also implement purely software functionality. Topics are the third slot type. Topics are used to represent events. A topic fires to indicate that the event has taken place.

A link is a specific kind of a property slot. A link is used to designate execution flow in component based software. More specifically, a link is used to create a causal relationship between two different slots. Such relationship signifies, for example, that a function is to be invoked, in response to the invocation of another function. In the object model these relationships are usually defined by static code, (such as a conditional procedure call, for example) and cannot be changed without recompiling. In the component model links are often dynamic slots, thus they can be created removed during runtime, changing the execution flow of the software without requiring the software to be re-compiled.

Because the component model is built as an object oriented program, it is necessary to implement the component model using object oriented members. The terms class, member, field, and method refer to conventional object oriented concepts. The terms component-type, slot, property, action, and topic refer to component oriented concepts as they relate to the present invention.

One of the big differences between objects and components is that components may be changed at runtime. For example, adding a new method to an object typically requires recompiling the object's class. The component model allows us to define slots in components and add new slots at runtime. The slots defined in compiled code are frozen. Frozen slots are immutable, but gain the processing efficiency of compiled code. Slots defined at runtime are dynamic.

In object oriented programming, the storage of class definitions in a running program is handled by the compiler, and is largely invisible to the developer. For that reason, in object oriented programming a class is usually referred to as an abstract and not as an actual data structure. Thus, developers in most object-oriented environments can safely refer to the class as an abstract definition of actual objects without being confused by the fact that the class definition needs to be physically present somewhere in computer memory.

In the component model of this invention component-types must be stored and handled in computer memory. The storage of component-types is preferably done by the framework, by storing a component-type in an object, namely, the component-type object. Thus, the component-type object is the physical representation of a component-type. A reference from the component to the component-type object is used to represent the fact that a given component belongs to a component-type.

FIG. 1 is a flow chart, illustrating how a component-type is created, by creating a component-type object, and how several component instances based on that component-type are generated.

In order to create a new component type a developer needs to provide a class definition to the framework—the base class (step 100). In a preferred embodiment the developer provides the base class by adding it to the component based software. There is a predefined set of rules that maps members of the base class to different types of slots in the component model. These rules may be based on, for example, the types or the names of the members of the base class. The developer indicates what frozen slots a component-type should have by adding members to the base class definition that, according to the set of rules, correspond to these frozen slots. In a preferred embodiment the developer also adds a statement that registers the base class with the framework. The component based software is compiled and executed after the addition of the base class. Once the software is running, as part of an initialization procedure, the framework detects the base class and goes through the rest of the process of FIG. 1 in order to create one or more component-types and one or more components based on them.

The framework examines the base class and discovers all the relevant members in step 101. This step can be accomplished by introspection of the base class.

All types of slots (property, action, topic) comprise definitions. The definition of a property slot specifies the type of data the property slot holds and the name of the property slot. The definition of an action slot comprises the name of the action slot and the code implementing a method to execute that action. Similarly the definition of a topic slot comprises the name of the topic and code implementing the topic. Property slots include values as well, action and topic slots do not have values (but the methods that implement them may have any number of variables that are hidden at the component level). Property slots require getter and setter methods to obtain and set the value. These getter and setter methods are part of the property slot definition and are initially defined in the base class.

At step 102, each member of the base class corresponding to a property slot is examined for getter and setter methods. By convention, getter and setter methods are named by prefixing "get" and "set" to the name of the property slot, together with standard code to implement those functions, respectively.

The framework then creates a component-type object (step 103). The purpose of the component-type object is to indicate a component-type. The component-type object includes a data structure capable of storing and retrieving one or more slot definitions. Such data structure can be, for example, an array or a hashtable. The component-type object also includes a name, which is the name of the component-type. This name is either copied from the name of the base class, or identified by a developer in another way, such as by using a specified field in the base class.

In step 104, all of the slot definitions of the base class are stored in the component-type object. These are referred to as the frozen slot definitions. At step 105 the framework generates a slotmap class which is associated with the component-type object created in step 103. The slotmap class defines members that correspond to each property slot of the component-type object. The slotmap class also includes methods for creating additional dynamic slots.

The process thus far is repeated, at step 107, for every existing base class.

After one or more iterations the necessary number of component-type objects is created, at step 106. For each component-type object there is a respective slotmap class, instances of which can store unique values for frozen property slots as well as any dynamic slots that may be added.

Thus, one or more component-types have been created, but the software still lacks component based functionality, because there are no instances of those component-types present. In step 106 one or more components are generated from the existing component-type objects. The framework creates component instances in order to provide component level functionality. Component instances are created based on, for example, a data file or user input. For example, a data file can effectively contain a component system, that has already been designed by a developer or a user, the data file including component instances, their organization, their configuration properties, and execution flow within the system indicated via links. Furthermore, a user can use a graphical interface to create such a system from scratch, by instantiating components and creating links among them through a front-end browser or the like.

In a preferred embodiment, the framework is ultimately responsible for creating components. When a component of certain component-type needs to be created, the framework creates a component instance from an existing component generic class. The generic class includes one or more utility members that are used for communications with other components (or for administering the component) and a field suitable for inserting a slotmap or a reference to a slotmap. The framework identifies a component-type object associated with the component-type of the component to be created and the slotmap class associated with that component-type. It then creates a slotmap instance from the slotmap class. The framework attaches the slotmap instance to the component instance, so that the slotmap is effectively included in the component. It then creates a reference from the component instance to the component-type object. This reference, usually a pointer, designates an instance-type relationship, i.e. it designates that particular component instance belongs to the component-type described by the component-type object.

If the component-type object includes definitions of property slots, then the framework optionally assigns values for them. These values can be obtained, for example, from the data file or from user input. If the framework has a value that is to be assigned to a property slot, the framework accomplishes that by setting the value in the appropriate field in the slotmap object. This can be accomplished by accessing a setter method in the definition of the property slot, or by accessing setter methods for the component or the slotmap, or by accessing the slot value directly. If no slot values are provided then the framework either assigns default values or does nothing.

In an alternative embodiment, slotmap classes are not created for each component-type object, instead each component includes a generic slotmap, that is or contains a data structure that provides storage locations for the property slot values of the property slots, defined in the component-object, and can also store dynamic field definitions and-values. Data structures that serve this purpose are known in the art and may be an array, a hashtable etc.

The framework assigns a name to each component, the name being either generated by the framework or obtained in the same way the property slot values were.

Figure 2:
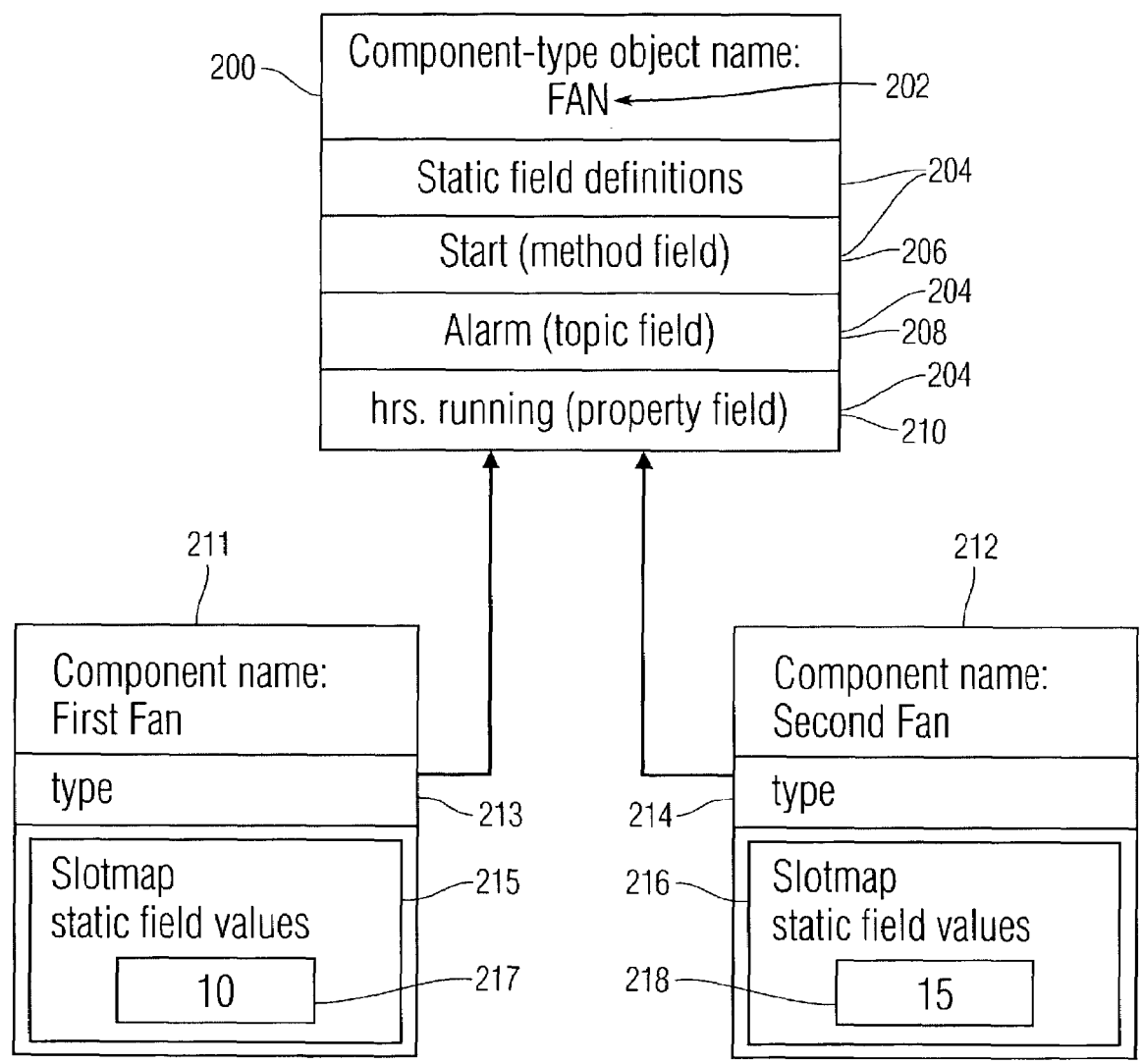
FIG. 2 is a block diagram showing two components generated from the same component type.

In this manner, the framework creates several components that belong to one or more component-types. FIG. 2 illustrates two such components 211 and 212 that both belong to a single component-type that is defined by a component-type object 200. The component-type object includes a name 202 and the definitions of the frozen slots 204. In this illustrated example, there is one frozen action slot start 206, one frozen topic slot alarm 206 and one frozen property slot hrs_running 210. Slot hrs_running 210 contains an integer, but in other examples, the property slot can contain more complex data or data structures or other data types. Slots 206 and 208 include the code needed to execute the method and topic, respectively. Components 211 and 212, named FirstFan and SecondFan, each include a slotmap 215, and 216. Each component's slotmap includes the component's value for the frozen property slot—217, and 218.

Figure 3:
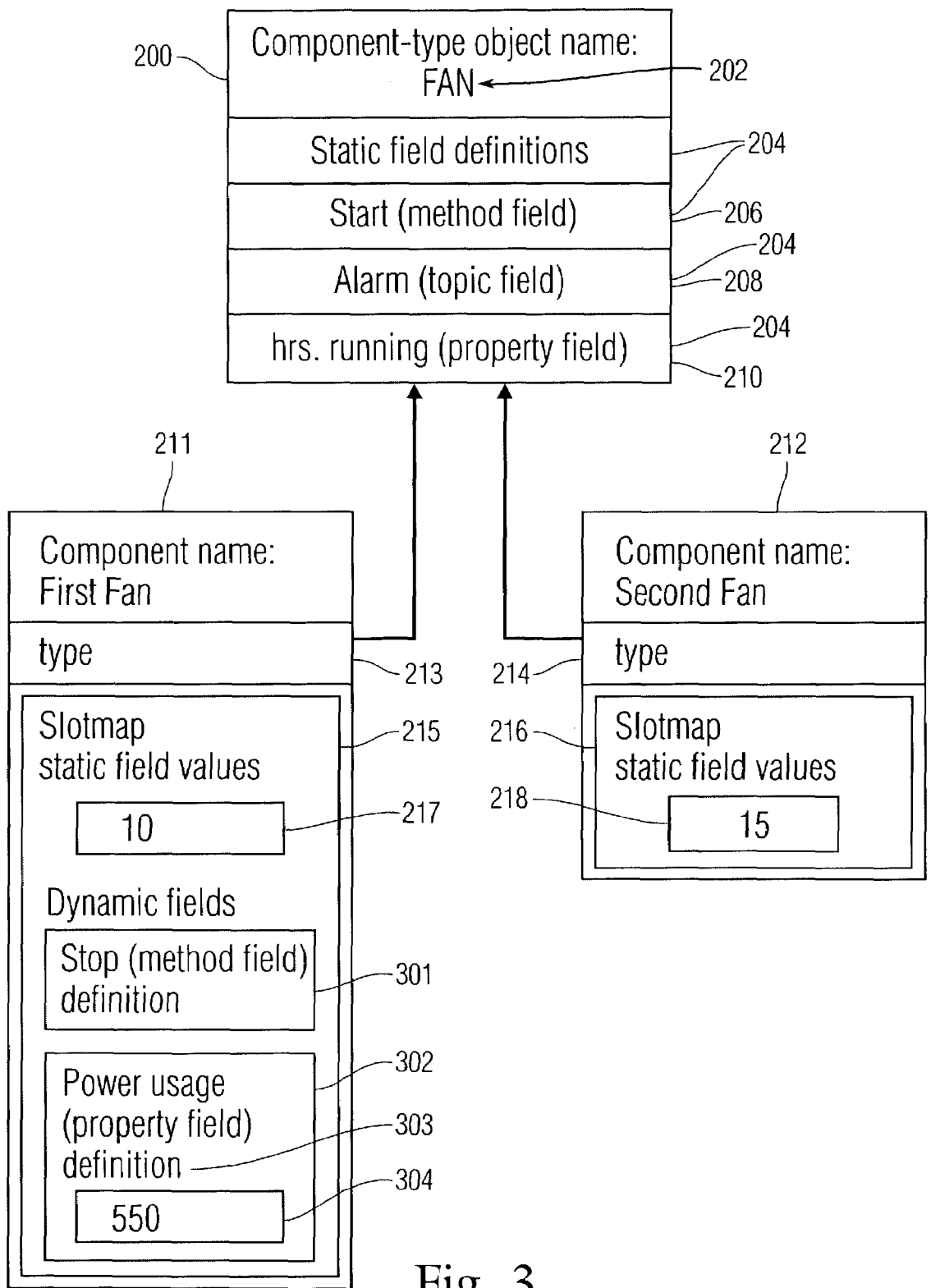
FIG. 3 is a block diagram showing a component system that includes a dynamic slot.

In accordance with a salient aspect of the preferred embodiment, while the software is executing, dynamic slots can be added to components. Dynamic slots are of the same types as frozen slots. The adding of dynamic slots during runtime is done by a user or by the software itself. Depending on implementation, dynamic slots are added by either making a request to the framework or invoking a utility procedure of the component. Regardless of which way is used, dynamic slots are added by being stored in the slotmap. A dynamic slot always has a definition, it also has a value if it is a property slot. The definition is stored in the Slotmap and the value, if applicable, is stored there as well. FIG. 3 shows the component system of FIG. 2 after two dynamic slots have been added to component 211. A dynamic action slot 301 called "Stop" had been added, by adding its definition to the slotmap 215. Also, a dynamic property slot 302 called power_usage has been added by adding its definition 303 and value 304 to the slotmap.

Notice that component 211 still references the same component-type object 200. The component-type object has not been changed to register the addition of dynamic slots. Thus, component FirstFan 211 is still of the same component-type even after the addition of two dynamic slots. And consequently components 211 and 212 are still of the same component-type regardless of the fact that component 211 has two more slots. This departure from the "pure" type-instance model is done for performance reasons: creating a new component-type for each changed component would slow down the system and require too much additional memory. Components possess utility methods that allow them to examine their slotmaps for dynamic slots and provide their definitions to an outside component, the framework, or another module of the software. These utility methods are necessary because the component-type object does not hold the definitions of the dynamic slots. Dynamic slots can be accessed by other components, the framework or another module of the software in pretty much the same way as frozen slots of the slotmap object.

Once created, dynamic slots can later be deleted by removing their definitions (and any values) from the slotmap. This may occur, for example, as a result of a test of a new proposed feature or functionality that is introduced free of recompiling the software, that is, without any interruption of service.

The ability to introduce dynamic slots without recompiling also permits a user to add new relationships and connectivity that influence program flow. This is achieved through a "link," which is a slot that holds a relationship between two components. More specifically a link holds a causal relationship between two slots (neither of which is the link) of two distinct components. For ease of reference, these two slots are referred to as the source and target slots. The components that hold these slots are respectively referred to as the target and source components. There are many possible causal relationships that can be represented by links. The types of links used in a preferred embodiment are listed in Table 1 with the types of slots they link. Note that since at the component level the concept of execution flow includes changes of property fields, all of the links listed in Table 1 control the execution flow of a component system.

TABLE 1

| Source | Target | Semantics |
| --- | --- | --- |
| Property | Property | When source property changes, set the target property |
| Property | Action | When source property changes, invoke the action |
| Action | Action | When source action is invoked, invoke target action |
| Action | Topic | When source action is invoked fire target topic |
| Topic | Action | When source topic fires, invoke the action |
| Topic | Topic | When source topic fires, fire target topic |

A user can create a flow of execution by linking various slots of various components. Links are frozen or dynamic. Dynamic links allow the execution flow of a component system to be changed while the software is running. All one has to do to change the execution flow, is create or delete links. In order to avoid creating and deleting the same links, a preferred embodiment allows links to be activated and deactivated. This provides the added advantage that frozen links, which cannot be deleted, can still be deactivated by an appropriately formulated dynamic link. A deactivated link does not function as a link, but still exists in the target component, and can be subsequently activated.

A link is implemented as one of the type of slots. In a preferred embodiment the link is included in the target component, that is, the component that holds the target slot. A link preferably includes the following slots: a source component field, holding a reference to or the name of the source component; a source field, holding the name of the source slot; a target field, holding the name of the target slot; and an "activated" flag that indicates whether it is activated or deactivated.

Links also include methods that are useful for handling them, such as Activate and Deactivate methods or methods that change the source field, the source component, and/or the target field. Note that the need for a reference to the target component is avoided in this arrangement because the link is already included in the target component; the target component being referenced indirectly by the link's placement.

In a preferred embodiment, when links are activated they create a knob at the source component. A knob is a data structure similar to a link, that is saved in the slotmap of the source component. The knob indicates to the source component that it must propagate events from its slots to those of the target component. A knob includes data fields similar to those of a link, but it includes a reference or the name of the target component instead of that of the source component. A knob does not include an activated flag. Rather, when a link is deactivated, the knob is simply removed.

Figure 4:
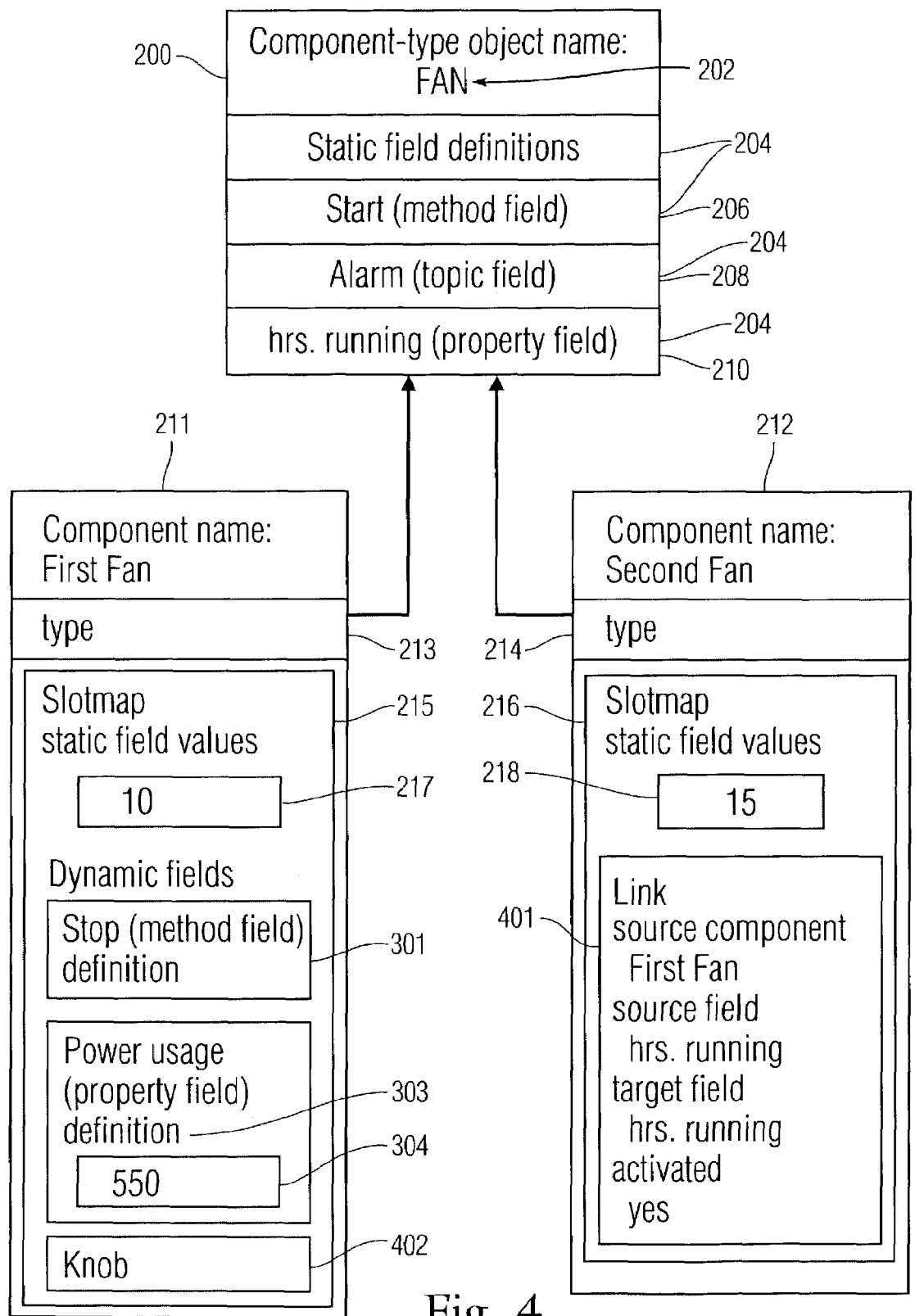
FIG. 4 is a block diagram showing a component system that includes a link.

FIG. 4 shows the components of FIG. 3 with a dynamic link 401 having been added. The link is activated so it causes a corresponding knob 402 to be created. Since the target and the source slot are properties, the effect of this link is, in the event that the value of hrs_running of FirstFan changes, to change the value of hrs_running of SecondFan to the new value of hrs_running of the first fan. In other words, this link will cause value 218 to follow value 217, once value 217 changes. A link behaves the same way regardless of whether it links frozen or dynamic slots (though there are some performance penalties if dynamic slots are involved).

Figure 5A:
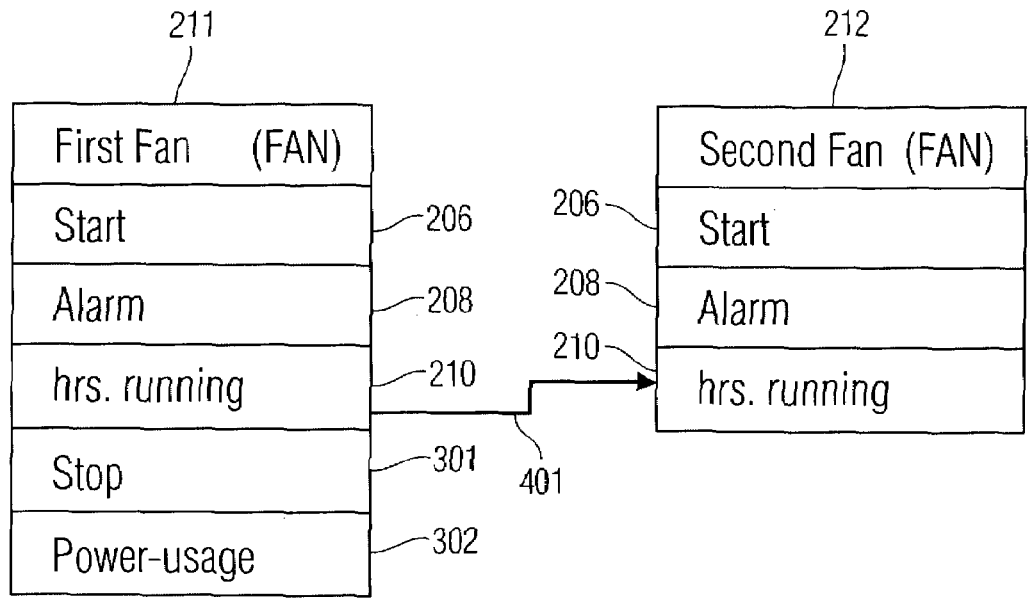
FIG. 5A is a block diagram showing a component level abstraction of a component system that includes a link, with the implementation details hidden.

FIG. 5A is an abstracted diagram of the component system of FIG. 4 with the implementation details missing. It shows the functionality of a link viewed from the component level. Here the link 401 is represented with an arrow from the source slot to the target slot, instead of a slot in component 211. The link slot is nevertheless present in component 211.

FIG. 5A exhibits one of the advantages of the component model. The component module allows a complex dynamic system to be abstracted and shown in a relatively simple way. A user is provided with visual interface in which one or more of the components of the component system are visually represented as widgets, or diagrams. In fact, a visual representation could be rendered similar to what is shown in FIG. 5A. Components can store their own representations in property slots, or those representations can be handled by a graphical module. For further details on a preferred visual interface that can operate in conjunction with the component model described herein, see U.S. patent application Ser. No. 10/485,848, filed on even date herewith, entitled "Real-Time Data Interface And Method For Browsers And The Like," which is hereby incorporated by reference as if set forth in its entirety herein.

Once the components are represented to a user through a graphical interface, the various relevant slots and values of these components are also shown. A user can be allowed to change values, or execute methods of components through such interface by click-selecting the various slots and dragging links between components to add links.

Furthermore, a user can be allowed, to add new components, to add or remove dynamic properties, to add and remove dynamic links, or to activate and de-activate links by manipulating visual representations of links, slots and components on a screen. Thus, a user visually reprograms a component based system.

Figure 5B:
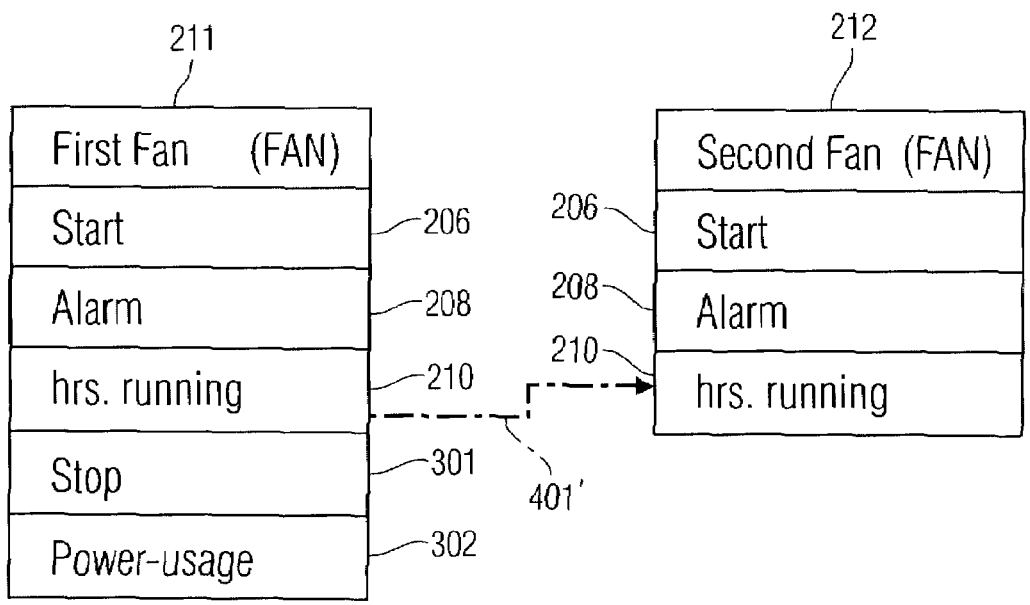
FIG. 5B is a block diagram showing the component system, shown in FIG. 5A, wherein the link has been removed.

FIG. 5B is an abstracted diagram of the component system shown in FIG. 5A, after link 401 has been removed. The removal of the link is indicated by dashed line 401'. Removal has been accomplished by removing the dynamic link slot 411 from component 211. Any other dynamic slot may be similarly removed.

One of the benefits of the preferred embodiment is that it combines the efficiency and speed of frozen slots with the flexibility of dynamic slots. At certain times dynamic slots prove to be too inefficient. Nevertheless, the preferred embodiment be used to quickly change and test the component system, by using dynamic slots in order to find an optimal configuration. Once an optimal configuration is found a recompile is done in order to convert all dynamic slots into frozen slots. After the recompile the system will retain its optimal configuration, with much better performance.

Figure 6:
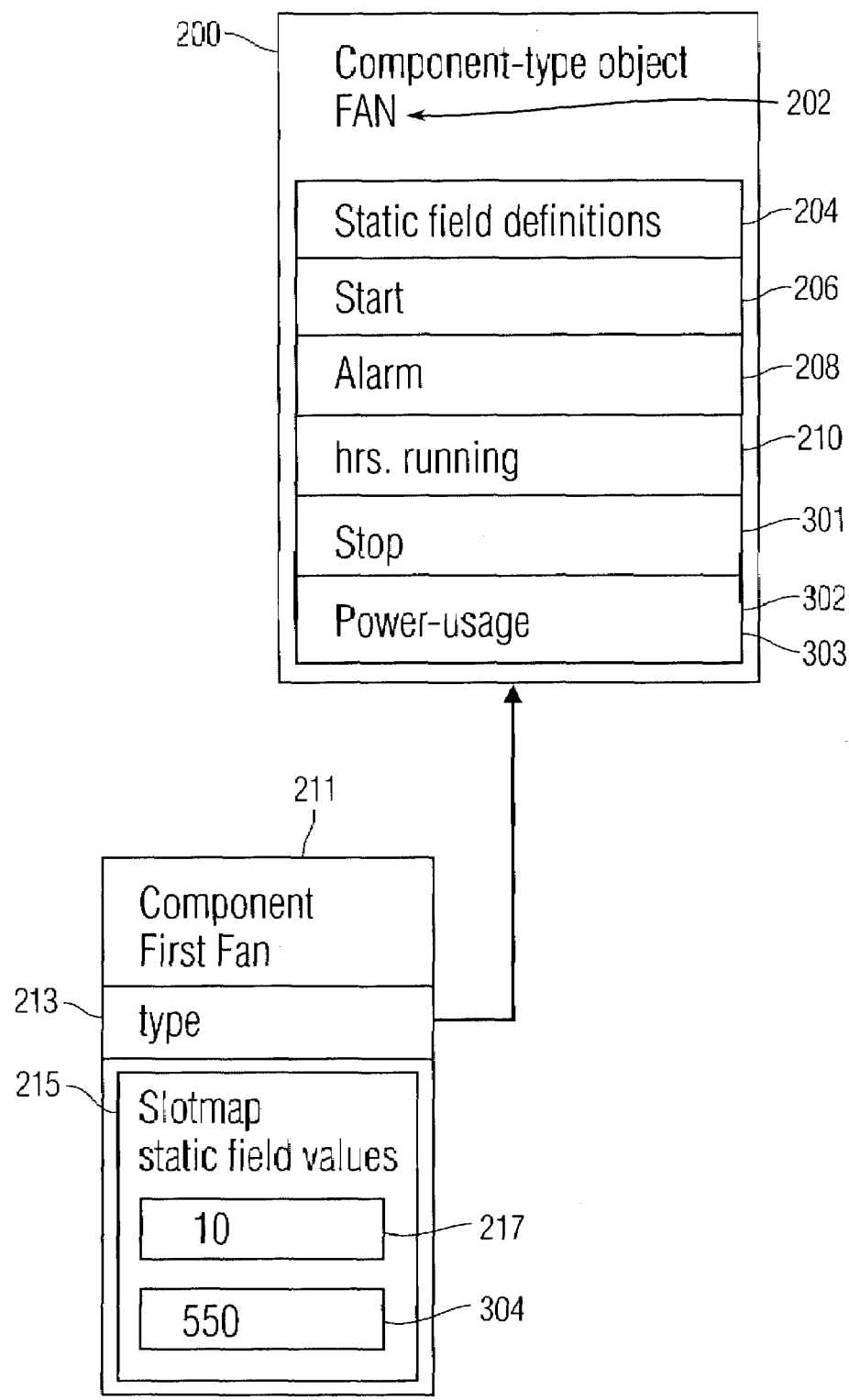
FIG. 6 is a block diagram of a component system that has been recompiled to improve efficiency.

FIG. 6 illustrates how component 211 of the system shown in FIG. 3 is optimized. Compiling dynamic slots into frozen slots can result in a change to the original component-type or a new component-type, if all the components of the original component-type did not have the same dynamic slots. Dynamic slots 301, 302 are converted to frozen slots by removing their definitions from the slotmap 215 and augmenting the frozen slot definition of the component-type base class 200. The value 304 of the property slot 302 remains in the slotmap 215, but is now associated with a frozen slot definition common to all components of the same component-type. The two values 217 and 304 are paired up with their respective definitions 210 and 303 by offsets listed in or derived from these definitions.

Figure 7:
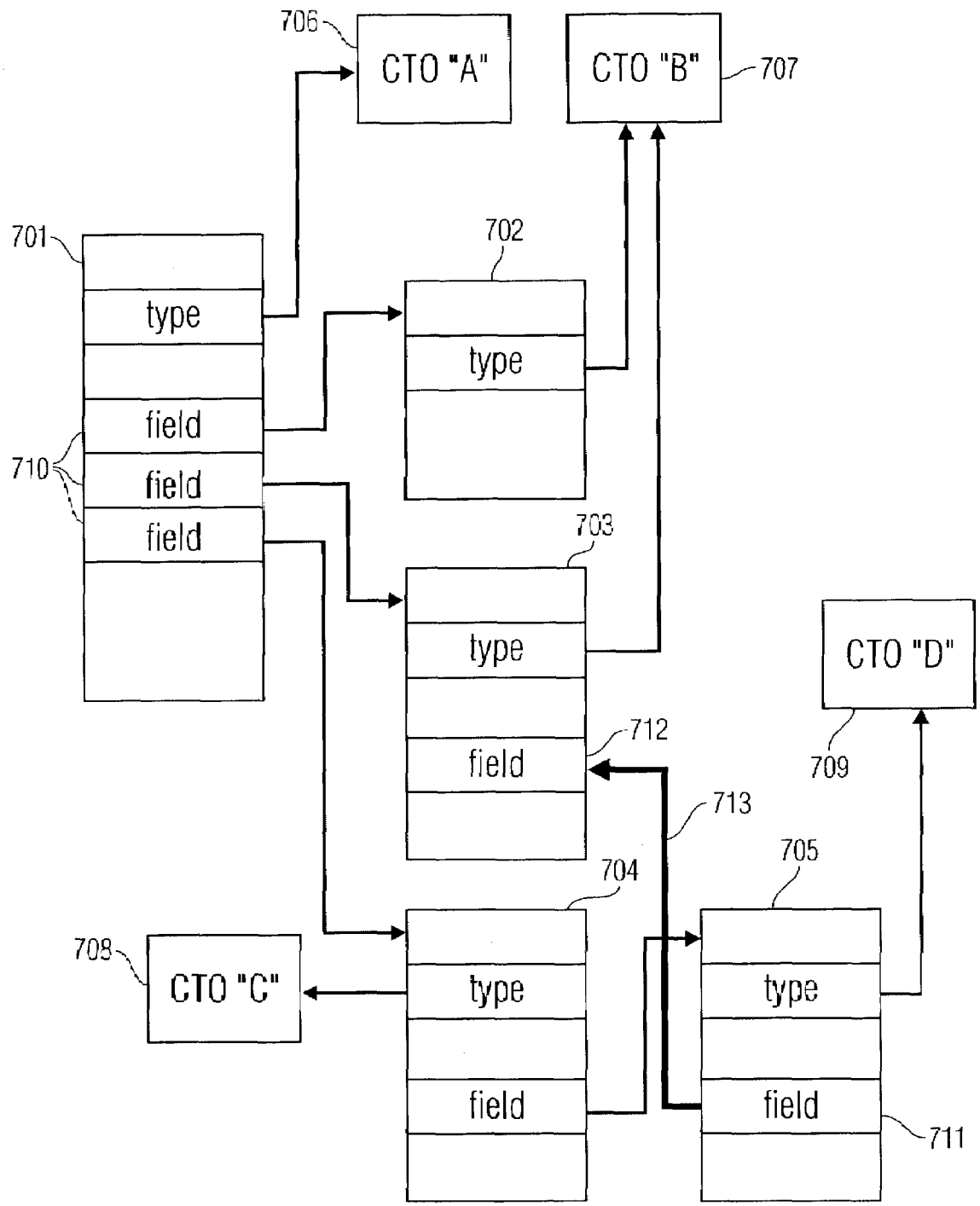
FIG. 7 is a block diagram showing a component system in a tree configuration.

FIG. 7 illustrates a preferred way of hierarchically organizing components into a component system. As already described, components can include other components as property slots. This is accomplished by including a reference to another component as the a property slot. In alternative embodiments, a link designating ownership is used instead of the reference.

It is preferable to utilize the ability of components to include other components and organize the components of a system in a tree structure, as shown in FIG. 7. There component-type objects 706, 707, 708 and 709 describe component-types A, B, C and D respectively. Component 701 is of component-type A, components 702 and 703 are of component-type B, component 704 is of component-type C and component 705 is of component-type D. Components 702, 703 and 704 are all included as slots in component 701, the inclusion relationship being defined by references in the slots 710 of component 701. Component 704 further includes component 705. There is also an execution flow link 713, illustrated with a bold arrow, that has slot 711 of component 705 as a source and slot 712 of component 703 as a destination. Components that include other components are referred to as parents. Components that are included in other components are referred to as children. More complex systems may be organized in similar structures. In a preferred embodiment all components of a system are organized in a single tree. This means that there is one parent component, referred to as the root component, that is not included in any other components and one or more non-root components that can trace their parentage to the root component. In FIG. 7 the root component is component 701. This organization creates an additional benefit in that every component is uniquely identified through a string that comprises of a sequential listing of the names of its ancestors, starting from the root and ending in the components name. This feature can be used to help ensure unique identification of components in a complex component system, in which new components from different vendors are continuously added to the system. The identification can be extended with a field name, in order to similarly provide unique identification for fields of components.

Since a visual interface is an important benefit of the component model, the present invention also includes a system for providing a visual interface. The system is especially useful for providing an interface for the component model, because it is based on visual objects, or widgets, and each such widget can visualize a component. Another useful feature is that the system combines great flexibility with relatively low resource use.

Figure 8:
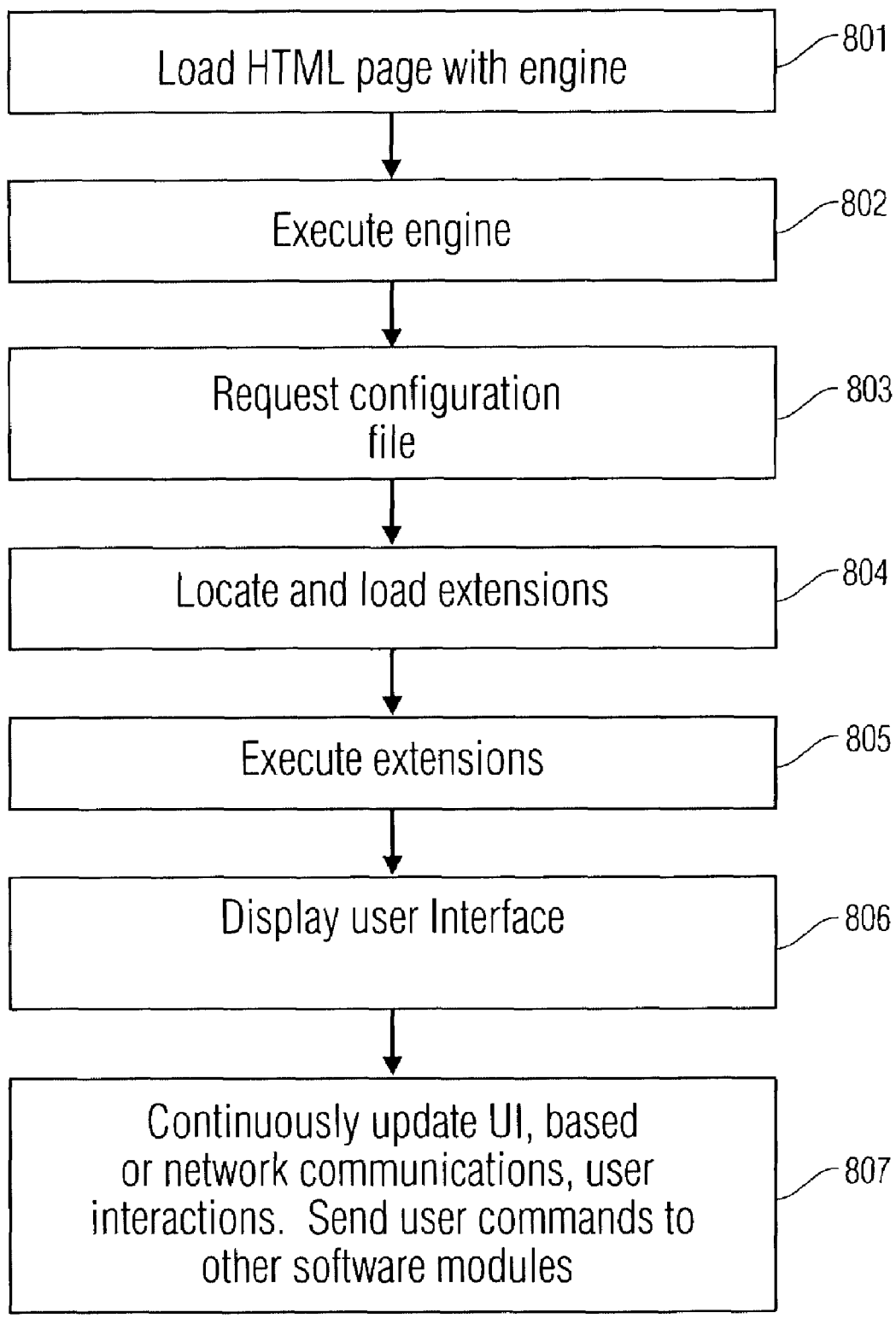
FIG. 8 is a flow chart showing the operation of the visual interface.

The visualization system is designed to be compatible with popular software used for displaying third party content over standardized file formats, such as an HTML browser. In a preferred embodiment the present invention is implemented as a Java applet, within an HTML file. The java applet is referred to as the engine. FIG. 8 is a flow chart showing the operation of the visualization system. A user loads an HTML page with the engine on an HTML browser in step 801. In step 802 the HTML browser executes the engine. In step 803 the engine requests a configuration file. The configuration file is requested over a computer network, or from the user's computer. In a preferred embodiment the configuration file is an XML file. The configuration file, includes the layout of a visual presentation, and it also includes references to one or more widgets, and placement and/or sizing information for these widgets.

Widgets are visual objects. Examples of widgets are representations of components, physical devices, graphs, pie-charts and tables. Widgets can be animated or provide information in a number of different ways. Widgets also optionally have the ability to interact with the user.

There is some executable code associated with each widget, referenced in the configuration file. This code is referred to as an extension. Extensions are located on the user's computer or on another computer connected to the user's computer by a computer network. Extensions can be located by references included in the configuration file. The engine parses the configuration file and locates the extensions. The engine then loads the extensions, downloading them over a computer network, if necessary (step 804). The engine then executes all the extensions in parallel. Once the extensions are executing they display the user interface with the help of the engine. Each extension displays the widget it is associated with. The engine displays the general layout, described in the configuration file, and it manipulates the displayed widgets in order to size and place them according to the configuration file. The extensions optionally communicate with other software modules, and change/update the widgets they are associated with according to these communications. In an exemplary embodiment a widget is a graphical representation of a component and the extension associated with that widget communicates with the component over a computer network. The extensions also optionally interact with the user, by accepting and responding to commands by the user. The extensions can also send or receive information from other software components, such as components, based on interaction with the user. The widgets thus continuously update, based on the software code of the extensions, communications with other software modules, and/or interaction with the user. The extensions can furthermore send control signals received from the user to other software modules.

For example, a widget represents a thermostat, which is controlled by a thermostat component. The extension corresponding to the thermostat widget sends requests for updated temperature readings over a network. The thermostat component answers. The extension then updates the temperature. The user interacts with the widget. For example, by clicking on the widget the user expresses a desire to view the temperature in degrees Celsius instead of Fahrenheit. The extension receives that request and updates the widget. The user can also send commands to the actual thermostat through the widget. For example, if the user wishes to switch the thermostat off, or to put it into a power saving mode, the widget will forward the command to the thermostat component.

An alternative embodiment of the visual interface system assures higher efficiency when network communications are often utilized by the extensions. Because multiple network communications by multiple extensions, operating in parallel, often cause performance problems, in the alternative embodiment extensions do not initiate network communications but instead send requests to the engine. The engine aggregates network communication requests over predefined periods of time and attempts to combine them in bundles of larger size, and send them over the network, thus improving network efficiency. Only communications going out to the same computer may be bundled. Also there must be a software module at the receiving end that is able to unbundle the communications. The engine also receives bundles from certain software modules, the bundles containing communications sent to one or more extensions, unbundles them into single communications and sends these single communications to the extensions to which they were addressed to. This embodiment is most effective when many of the extensions communicate with the same software module.

The visual interface system has been described using languages, formats an protocols, such as HTML, Java, XML, for the purpose of concreteness and clarity. The visual interface system is not limited to these languages, formats and protocols. The visual interface system may be configured to operate with any language that allows embedded applications. Any data file format, including proprietary data formats may be used instead of XML.

Again, for further details on a preferred visual interface that can operate in conjunction with the component model described herein, see the aforementioned U.S. patent application entitled "Real-Time Data Interface And Method For Browsers And The Like."

Not all of a software program needs to be implemented in the component model. Component based functionality tends to be slower and bulkier, than traditional object oriented code. Thus, in preferred embodiments, only the portions of the code that may need to be dynamically modified, or use other features of the component model may be implemented in the component model. But, code that is not technically implemented in the component model may still be encapsulated in a component so that it appears as a component to other components.

Computers described in the present documents may be any computing devices. Computer networks include wireless networks.

The invention has been described in connection with a particular embodiment but is defined without limitation by the claims appended hereto and includes insubstantial variations in elements and method steps.

What is claimed is:

1. A method for executing a software program on a machine, the software program including one or more components of the same component-type, the component type being defined from a base class comprising one or more slot definitions at least one of which is a property slot definition, the components being generated during run-time by the steps comprising:

identifying all property slot definitions in the base class;

locating getter and setter methods for each identified property slot definition in the base class;

generating a component-type object, the component-type object being configured to store slot definitions in a memory of the machine;

storing in the component-type object the property slot definitions identified in the identifying step;

generating one or more components, each component having a slotmap and a reference to the component-type object, wherein each component slotmap includes a storage location in the machine memory for storing a value each property-slot definition stored in the component-type object;

setting a property slot value, by inserting the property slot value into a storage location in the slotmap of a particular one of the one or more components, the property slot value being associated with one of the property slot definitions in the component-type object; and during execution of the software program, adding a dynamic slot to the slotmap of a first component from among the one or more components while leaving the component-type object unchanged, the adding step being free of any compiling step and further comprising the steps of:
adding a dynamic property slot definition to the slotmap of the first component; and
adding a dynamic property slot value to the slotmap of the first component.

2. The method of claim 1 further including the step of:
generating a slotmap class, the slotmap class defining one or more storage locations in the machine memory for storing the values of each property slot whose definitions were identified in the identifying step;
wherein in the generating of one or more components step each slotmap is an instance of the slotmap class.

3. The method of claim 1 wherein at least one of the definitions of the base class is an action slot definition and further comprising the steps of:
identifying one or more action slot definitions in the base class; and
storing the one or more action slot definitions in the component-type object in the machine memory.

4. The method of claim 1 wherein at least one of the definitions of the base class is a topic slot definition and further comprising the steps of:
identifying one or more topic slot definitions in the base class; and
storing the one or more topic slot definitions in the component-type object in the machine memory.

5. The method of claim 1 wherein the dynamic slot is an action slot and the adding step comprises:
adding a dynamic action slot definition to the slotmap of the first component.

6. The method of claim 5, further comprising the steps of:
executing the software program for a period of time;
removing the dynamic action slot from the first component;
adding a frozen action slot definition to the component-type object, the frozen action slot definition being identical to the dynamic action slot definition;
wherein the step of adding a frozen action slot definition is performed by at least partially compiling the software program.

7. The method of claim 1 wherein the dynamic slot is a topic slot and wherein the adding step comprises:
adding a dynamic topic slot definition to the slotmap of the first component.

8. The method of claim 7, further comprising the steps of:
executing the software program for a period of time;
removing the dynamic topic slot from the first component;
adding a frozen topic slot definition to the component-type object, the frozen topic slot definition being identical to the dynamic topic slot definition;
wherein the step of adding a frozen topic slot definition is performed by at least partially compiling the software program.

9. The method of claim 1 further comprising the step of, during execution of the software program, removing the dynamic slot from the first component, the removing step being free of any compiling step.

10. The method of claim 1, further comprising the steps of:
executing the software program for a period of time;
removing the dynamic property slot from the first component;
adding a frozen property slot definition to the component-type object, the frozen property slot definition being identical to the dynamic property slot definition;
adding a frozen property slot value to the slotmap of the first object, the frozen property value being identical to the dynamic property slot value;
wherein the steps of adding a frozen property slot definition and a frozen property slot value are performed by at least partially compiling the software program.

11. The method of claim 1, further comprising the steps of:
displaying a graphical representation of the software program; and
allowing a user to manipulate the graphical representation;
wherein the adding step is performed in response to the user's manipulation of the graphical representation.

12. The method of claim 11, further including the step of removing the dynamic slot in response to the user's manipulation of the graphical representation.

13. The method of claim 1, wherein a plurality of components is generated to define code, each component having a respective slotmap and a reference to the same component-type object, wherein the dynamic slot is a link which defines a flow of execution of the code from a source slot in a second component from among the two or more components to a target slot in the first component.

14. The method of claim 13, further comprising the steps of:
displaying a graphical representation of the software program which includes a graphical representation of the link; and
allowing a user to manipulate the graphical representation of the link;
wherein the adding step is done in response to the user's manipulation of the graphical representation of the link.

15. The method of claim 13, wherein the source slot is a property slot and the target slot is a property slot, the method including the additional step of executing the code so that the value of the target slot changes with any changes of the value of the source slot.

16. The method of claim 13, wherein the source slot is a property slot and the target slot is an action slot, the method including the additional step of executing code so that the target slot is invoked in response to changes of the source value.

17. The method of claim 13, wherein the source slot is a topic slot and the target slot is an action slot, the method including the additional step of executing code so that the target slot is invoked in response of the source slot firing.

18. The method of claim 13, wherein the source slot is a topic slot and the target slot is a topic slot, the method including the additional step of executing code so that the target slot fires in response to the source slot firing.

19. The method of claim 13, wherein the source slot is an action slot and the target slot is an action slot, the method including the additional step of executing code so that the target slot is invoked in response to the source slot being invoked.

20. The method of claim 13, wherein the source slot is an action slot and the target slot is a topic slot, the method including the additional step of executing code so that the target slot fires in response to invocation of the source slot.

21. The method of claim 13, wherein the link comprises:
a reference to the second component;
the slot name of the source slot; and
the slot name of the target slot.

22. The method of claim 1, further comprising the step of automatically designating unique names to components in a component based software system, wherein the automatically designating step includes the steps of:
  creating a root component, the root component having no parents;
  placing one or more non-root components within the root component;
  placing one or more non-root components within other non root components so that the components form a tree structure and each non-root component has one parent;
  assigning a first component, among the non root components, a unique identification string comprising a sequential list of the names of the ancestors of the component and the component's name.

23. The method of claim 22 wherein the first component comprises a slot and further comprising the step of:
  providing an identification to the slot.

24. The method of claim 23, wherein the slot is a dynamic slot.

25. The method of claim 1 wherein the step of adding a dynamic slot is performed in response to user interaction with the executing software.

26. The method of claim 1, including the additional step of invoking a utility procedure of the first component, wherein the step of adding a dynamic slot is performed in response to the invoking step.

27. The method of claim 1, including the additional step of making a request to a program framework, wherein the step of adding a dynamic slot is performed in response to the making step.

28. A software program product embodied in a memory of a machine for executing a software program on the machine, the software program including one or more components of the same component-type, the component type being defined from a base class comprising one or more slot definitions at least one of which is a property slot definition, the components being generated during run-time, comprising:
  software code for identifying all property slot definitions in the base class;
  software code for locating getter and setter methods for each identified property slot definition in the base class;
  software code for generating a component-type object, the component-type object being configured to store slot definitions in a memory of the machine;
  software code for storing in the component-type object the property slot definitions identified in the identifying step;
  software code for generating one or more components, each component having a slotmap and a reference to the component-type object, wherein each slotmap includes a storage location in the machine memory for storing a value for each property-slot definition stored in the component-type object;
  software code for setting a property slot value, by inserting the property slot value into a storage location in the slotmap of a particular one of the one or more components, the property slot value being associated with one of the property slot definitions in the component-type object; and
  software code for adding a dynamic slot to the slotmap of a first component from among the one or more components while leaving the component-type object unchanged, the dynamic slot being added during execution of the software program free of any compiling step, the software code for adding a dynamic slot adding a dynamic property slot definition to the slotmap of the first component and adding a dynamic property slot value to the slotmap of the first component.

* * * * *